Nov. 17, 1953  J. C. KREJCI  2,659,201
GAS TURBINE COMBUSTION CHAMBER WITH PROVISION
FOR TURBULENT MIXING OF AIR AND FUEL
Filed Nov. 26, 1947
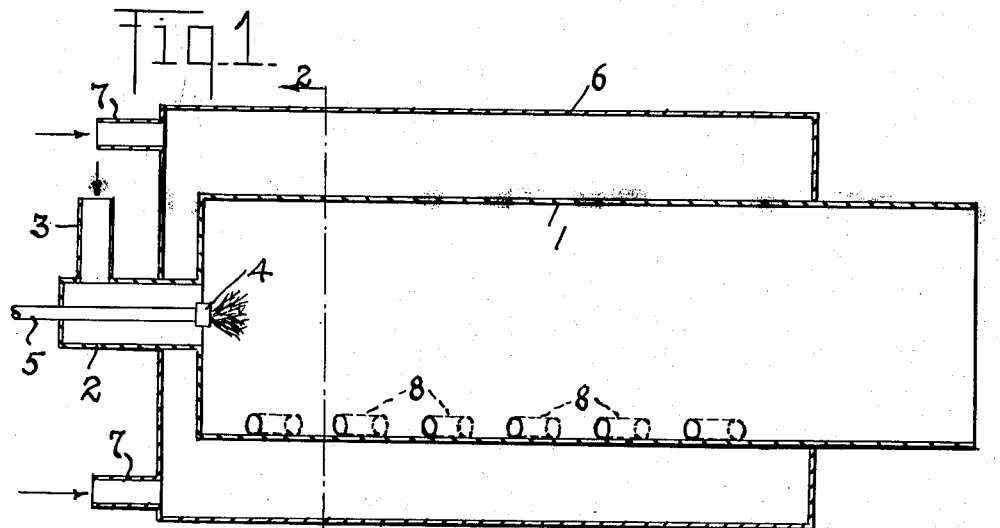
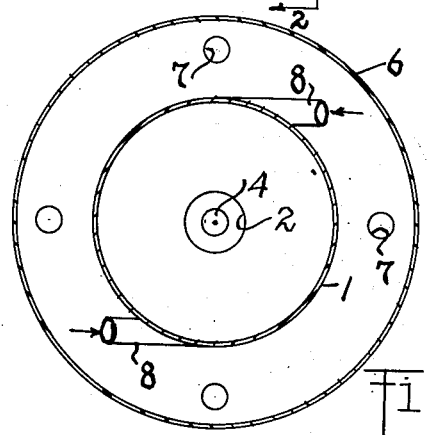
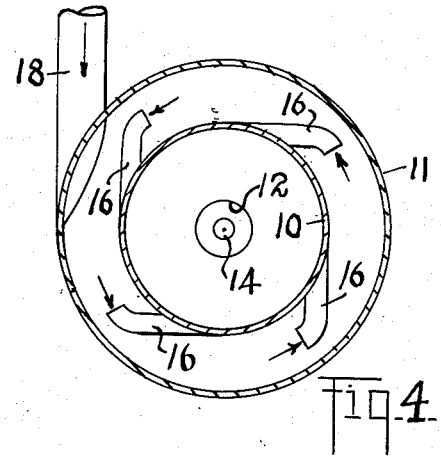
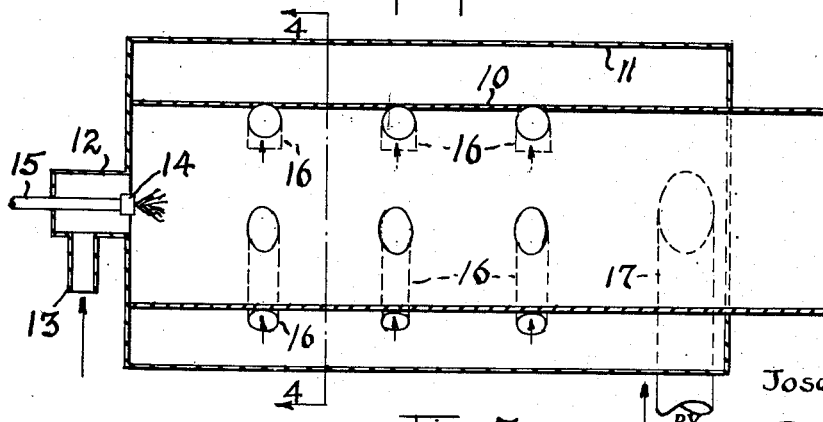
INVENTOR.
Joseph C. Krejci
Darby Darby
Att'ys.

Patented Nov. 17, 1953

2,659,201

UNITED STATES PATENT OFFICE 2,659,201

GAS TURBINE COMBUSTION CHAMBER WITH PROVISION FOR TURBULENT MIXING OF AIR AND FUEL

Joseph C. Krejci, Phillips, Tex., assignor to Phillips Petroleum Company, a corporation of Delaware Application November 26, 1947, Serial No. 788,266

4 Claims. (Cl. 60—39.65)

This invention is concerned with improvements in combustion chambers for use in conjunction with gas turbines, jet engines and the like.

An object of this invention is to provide a combustion chamber so constructed as to prevent the deposit of carbon on the walls thereof.

Another object of this invention is to so construct a combustion chamber that a part at least of the air supplied thereto to support combustion is used to blanket the wall thereof to prevent localized overheating of the wall.

Another object of this invention is to supply the air to the combustion chamber in the form of a moving blanket for cooling the wall of the combustion chamber and preventing the deposition of carbon thereon.

A more specific object of this invention is to form the cooling blanket from a blanket of moving air traveling circumferentially along the wall or helically with respect thereto.

A broader object of the invention is to provide for the supply of air to a combustion chamber in such a manner as to create a turbulence which insures faster mixing of the air with the fuel to thereby effect faster combustion and greater heat release per unit volume of combustion space.

Finally, it is an object of this invention to accomplish all of the above objects conjointly.

This invention resides substantially in the combination, construction, arrangement and relative location of parts, all as will be hereinafter described.

In the accompanying drawing—

Figure 1 is a vertical longitudinal central cross-sectional view through one form of combustion chamber in accordance with this invention;

Figure 2 is a cross sectional view taken on the line 2—2 of Figure 1;

Figure 3 is a view similar to Figure 1 of a modified structure; and

Figure 4 is a cross sectional view taken on the line 4—4 of Figure 3.

As will appear from the following description of this invention, the combustion chamber is in such form that a predominant portion of the air used to support combustion is introduced tangentially into the chamber which is preferably cylindrical while the fuel in introduced axially. Additionally, some air may be introduced axially along with the fuel. This method of introducing the air causes it to flow helically along the inner wall of the combustion chamber forming a protecting blanket therefor, preventing the deposit of carbon thereon, and causing rapid mixture between the air and fuel in the central portion of the chamber.

It is possible in such a combination to rapidly burn large amounts of fuel in a limited combustion space, thereby effecting, as is desired for such devices, a very rapid release of heat. As will be understood by those skilled in the art from the following description, the structure is adapted to burn fluid fuels in either liquid or gaseous form and solid fuels in powdered form.

Referring to Figures 1 and 2, the combustion chamber proper is shown at 1 and is preferably in cylindrical form although it may have other curved circumferential forms. As illustrated, the combustion chamber 1 has an axial air inlet 2 at one end which in turn is provided with a radial air supply conduit 3. Centrally located in the chamber formed by the extension 2 is a fuel nozzle 4 connected to a fuel supply line 5. Surrounding a substantial portion of the combustion chamber 1 is a housing 6 forming an annular closed space thereabout. The end wall of the housing 6 preferably at the air and fuel supply end of the combustion chamber is provided with a plurality of air inlets 7. The combustion chamber 1 is provided with a series of tangential air inlets 8. The conduits 8 may lie at right angles to the axis of the combustion chamber or at an angle thereto as illustrated in Figures 1 and 2 pointing forwardly of the combustion chamber, as shown, although it will be understood that they may point rearwardly thereof. As illustrated, the inlets 8 are arranged in sets in diametrically opposed relation but this arrangement is not essential. Likewise, only two sets of conduits are shown but one may be sufficient and in some cases more than two may be desirable.

It will be appreciated that the fuel is delivered into the combustion chamber 1 by the nozzle 4 in a generally axial direction and at the same time a part of the air to support combustion is also introduced axially through the conduit 3 and extension 2 so that the air is discharged around the nozzle. The axially introduced air is called "jacket air." Another portion of the required air is introduced by means of the conduit 7 into the annular space formed by the combustion chamber 1 and housing 6 where it is preheated. Air is discharged from this annular space through the inlets 8 into the combustion chamber 1 circumferentially in the case where the inlets are at right angles to the axis of the combustion chamber or helically in the case as illustrated where the inlets 8 lie at an angle to the axis of the combustion chamber. In the form illustrated this air will have a helical motion forwardly of the combustion chamber, that is toward the nozzle, but as will be apparent it may have a motion away from the nozzle, that is forwardly to the combustion chamber if the inlets 8 are inclined in the opposite direction.

As a result of this relative arrangement of the fuel and air inlets there is formed a forwardly or axially moving stream of fuel and air and a circumferentially circular or helical blanket of air moving about the axis of the combustion chamber and along the inner wall thereof. By this arrangement the deposition of carbon on the inner wall of the combustion chamber is substantially prevented and in addition localized heating of the wall of the combustion chamber is prevented, thereby increasing its life. The relative directions of flow of the air and fuel cause considerable turbulence, especially at the central portion of the combustion chamber, causing a faster and more complete mixing of air and fuel. It follows, therefore, that more rapid combustion takes place with a greater heat release per unit volume of combustion space. There is, of course, additional advantage in that the air supplied through the conduit 7 to the annular space is preheated thereby minimizing any tendency of this air to lower the temperature in the combustion space.

An obvious modification of this arrangement is the possibility of positioning the air inlets 8 on the combustion chamber 1 so that they supply the air along lines nearly at right angles to the axis of the combustion chamber or at lesser angles, either rearwardly or forwardly thereof.

The modified structure of Figures 3 and 4 includes the combustion chamber 10, preferably of curved circumferential form, substantially enclosed within a housing 11 forming an annular space therebetween. The combustion chamber is provided with an extension 12 having an air inlet branch 13. Arranged centrally of the extension 12 is a nozzle 14 and a fuel supply connection 15. The combustion chamber 10 is provided in this case with three sets of four tangential air inlets 16 having curved free ends so as to open into the annular space in a circumferential direction, as illustrated in Figure 4. The housing 11 is provided with one or more tangential air inlets. As shown, the air inlet 17 is at the forward end on the far side and air inlet 18 is at the rear end on the front side.

With this arrangement it will be seen that fuel and a part of the air for combustion are introduced axially of the chamber 10. The remainder of the air is introduced into the annular space circumferentially and the curved ends of the air inlets 16 are arranged to face the direction of rotational flow of the air in this space so as to be able to enter these inlets freely. The air is discharged from the inlet 16 into the chamber 10 circumferentially, and if the air inlets lie at other than a right angle to the axis of the combustion chamber it will move therein in a helical direction along the inner wall. Some of the air inlets 16 can be arranged radially to the combustion chamber and others at right angles or some other angle thereto as a means of controlling mixing of air and fuel.

It will be apparent that this construction results in advantages similar to those previously described.

By way of example, the combustion chambers 1 and 10 and their inlets 8 and 16 respectively, may be made of stainless steel while the housings 6 and 11 may be made of carbon steel. In some forms of the apparatus it may be desirable to line the combustion chamber with a refractory lining.

In one test run of the apparatus of Figures 1 and 2 natural gas was burned successfully at a maximum rate of 8000 C. F. H. (8,000,00 B. t. u.). The maximum amount of fuel that could be burned was set by the volume of air available so that the actual limit of the device was not determined. In the test, however, the heat was released at the maximum rate of 1,450,000 B. t. u. per cubic foot of combustion space. However, the temperature gradient in the combustion chamber indicated that combustion was complete in the first third of the combustion chamber, indicating a possible maximum heat release of three times the above figure. These results indicate a very efficient device, especially when it is considered that the pressure in the combustion chamber was about atmospheric. As is well understood the pressure of several atmospheres much more fuel could have been burned.

In another test of the same apparatus a hexane fraction was burned at a maximum rate of 40 G. P. H. (about 5,500,000 B. t. u.). The hexane fraction was sprayed as a liquid by the fuel nozzle under a pressure of about 100 p. s. i.

In another test a highly aromatic oil (20 A. P. I.) was burned up to a maximum rate of 25 G. P. H. (about 3,600,000 B. t. u.). This fuel was either preheated to 700° F. and introduced as a vapor or sprayed into the combustion chamber as a liquid at 100 p. s. i.

Complete combustion was obtained in all of the above tests and no carbon deposits were formed on the inner wall of the combustion chamber 1 in any of the runs. These tests establish that the combustion chamber disclosed herein is capable of utilizing a wide variety of fuels. It is therefore suitable for many applications, particularly those in which it is desirable to burn a large amount of fuel in a limited combustion space.

The following table is exemplary of tests made with the construction of Figures 3 and 4 wherein, as explained above, stainless steel and carbon steel were employed in constructing the parts. The fuel used was a refinery hexane fraction.

Runs J-12, J-13 and J-15 were made with a construction employing a total of six tangential air inlet ports 16 while runs J-17, J-20 and J-21 were made with a total of twelve tangential air inlet ports. The test data are:

| Run No. | Tang. Air | Jacket Air | Total Air × Theoretical | Heat Release per cu. ft. | Feed Rate, G. P. H. | Gas Analysis, Center Sample [1] | |
|---|---|---|---|---|---|---|---|
| | | | | | | Vol. Percent H$_2$ | Vol. Percent CO |
| J-12 | 19,200 | 3,500 | 1.99 | 4,400,000 | 10 | 0.00 | 0.16 |
| J-13 | 33,900 | 3,800 | 3.29 | 4,400,000 | 10 | 0.31 | 0.15 |
| J-15 | 42,900 | 1,660 | 3.89 | 4,400,000 | 10 | 0.25 | 0.00 |
| J-17 | 51,900 | 1,170 | 3.10 | 6,600,000 | 15 | 0.30 | 0.20 |
| J-20 | 68,400 | 1,170 | 4.07 | 6,600,000 | 15 | 0.15 | 0.11 |
| J-21 | 85,400 | 1,240 | 5.06 | 6,600,000 | 15 | 0.20 | 0.12 |

[1] Sample taken at center of outlet end of combustion chamber.

What is claimed is:

1. A combustion chamber comprising a cylindrical casing having an axial unobstructed air inlet and a fuel inlet at one end of said cylinder to form an axial combustion zone, a housing surrounding said casing to enclose an annular space around it, air inlets longitudinally spaced along said casing and located circumferentially around the housing so that air introduced into the combustion chamber will have in its direction of travel a tangential component, thereby creating around the inside of the combustion chamber a cushion of secondary air for supporting combustion, the said air inlets from the annular air space around the combustion chamber being conduits extending into said annular space, the free ends being circumferentially displaced from the inlets to the combustion chamber.

2. The combination in accordance with claim 1, wherein the air intake conduits have their free ends extending circumferentially partially around said annular space and open into the combustion chamber in the direction of movement of air in said annular space.

3. The structure in accordance with claim 2 in which primary air is introduced behind the fuel itself and contact with the fuel is made only upon entrance to the combustion chamber.

4. The apparatus in accordance with claim 3, in which the secondary air inlet is downstream from the primary air inlet.

JOSEPH C. KREJCI.

References Cited in the file of this patent

UNITED STATES PATENTS

| Number | Name | Date |
|---|---|---|
| 1,618,808 | Burg | Feb. 22, 1927 |
| 1,910,735 | Zikesch | May 23, 1933 |
| 2,039,890 | De Coster | May 5, 1936 |
| 2,107,365 | Bray | Feb. 8, 1938 |
| 2,110,209 | Engels | Mar. 8, 1938 |
| 2,398,654 | Lubbock et al. | Apr. 16, 1946 |
| 2,475,911 | Nathan | July 12, 1949 |